(12) United States Patent
Chapiro et al.

(10) Patent No.: US 10,769,754 B2
(45) Date of Patent: Sep. 8, 2020

(54) VIRTUAL REALITY CINEMA-IMMERSIVE MOVIE WATCHING FOR HEADMOUNTED DISPLAYS

(71) Applicant: Dolby Laboratories Licensing Corporation, San Francisco, CA (US)

(72) Inventors: Alexandre Chapiro, Sunnyvale, CA (US); Chaitanya Atluru, San Jose, CA (US); Chun Chi Wan, Campbell, CA (US); Haricharan Lakshman, Sunnyvale, CA (US); William Rozzi, Califon, NJ (US); Shane Ruggieri, Campbell, CA (US); Ajit Ninan, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/660,548

(22) Filed: Oct. 22, 2019

(65) Prior Publication Data

US 2020/0134780 A1 Apr. 30, 2020

Related U.S. Application Data

(60) Provisional application No. 62/753,777, filed on Oct. 31, 2018.

(51) Int. Cl.
*G06T 3/00* (2006.01)
*G06T 19/00* (2011.01)
(Continued)

(52) U.S. Cl.
CPC ........ *G06T 3/0093* (2013.01); *G02B 27/0172* (2013.01); *G06F 3/013* (2013.01); *G06T 19/003* (2013.01); *G06T 19/006* (2013.01); *G02B 2027/0134* (2013.01); *G02B 2027/0187* (2013.01)

(58) Field of Classification Search
CPC ........... G06T 3/00; G06T 19/00; G02B 27/00; G02B 2027/00; G06F 3/00
See application file for complete search history.

(56) References Cited

U.S. PATENT DOCUMENTS

2012/0120498 A1* 5/2012 Harrison ................ G02B 27/30
359/630
2017/0263056 A1* 9/2017 Leppanen ............. G06T 19/006

OTHER PUBLICATIONS http://bigscreenvr.com.
(Continued)

*Primary Examiner* — Maryam A Nasri

(57) ABSTRACT

Peripheral-vision expanded images are streamed to a video streaming client. The peripheral-vision expanded images are generated from source images in reference to view directions of the viewer at respective time points. View direction data is collected and received in real time while the viewer is viewing display images derived from the peripheral-vision expanded images. A second peripheral-vision expanded image is generated from a second source image in reference to a second view direction of the viewer at a second time point. The second peripheral-vision expanded image has a focal-vision image portion covering the second view direction of the viewer and a peripheral-vision image portion outside the focal-vision image portion. The second peripheral-vision expanded image is transmitted to the video streaming client.

20 Claims, 8 Drawing Sheets

(51) Int. Cl.
*G06F 3/01* (2006.01)
*G02B 27/01* (2006.01)

(56) References Cited

OTHER PUBLICATIONS http://deadline.com/2017/12/paramount-pictures-first-ever-virtual-reality-movie-theater-with-top-gun-3d-1202209276/.
Zannoli, M. et al "The Perceptual Consequences of Curved Screens", ACM Transactions on Applied Perception (TAP) 15.1 (2017):6.

* cited by examiner

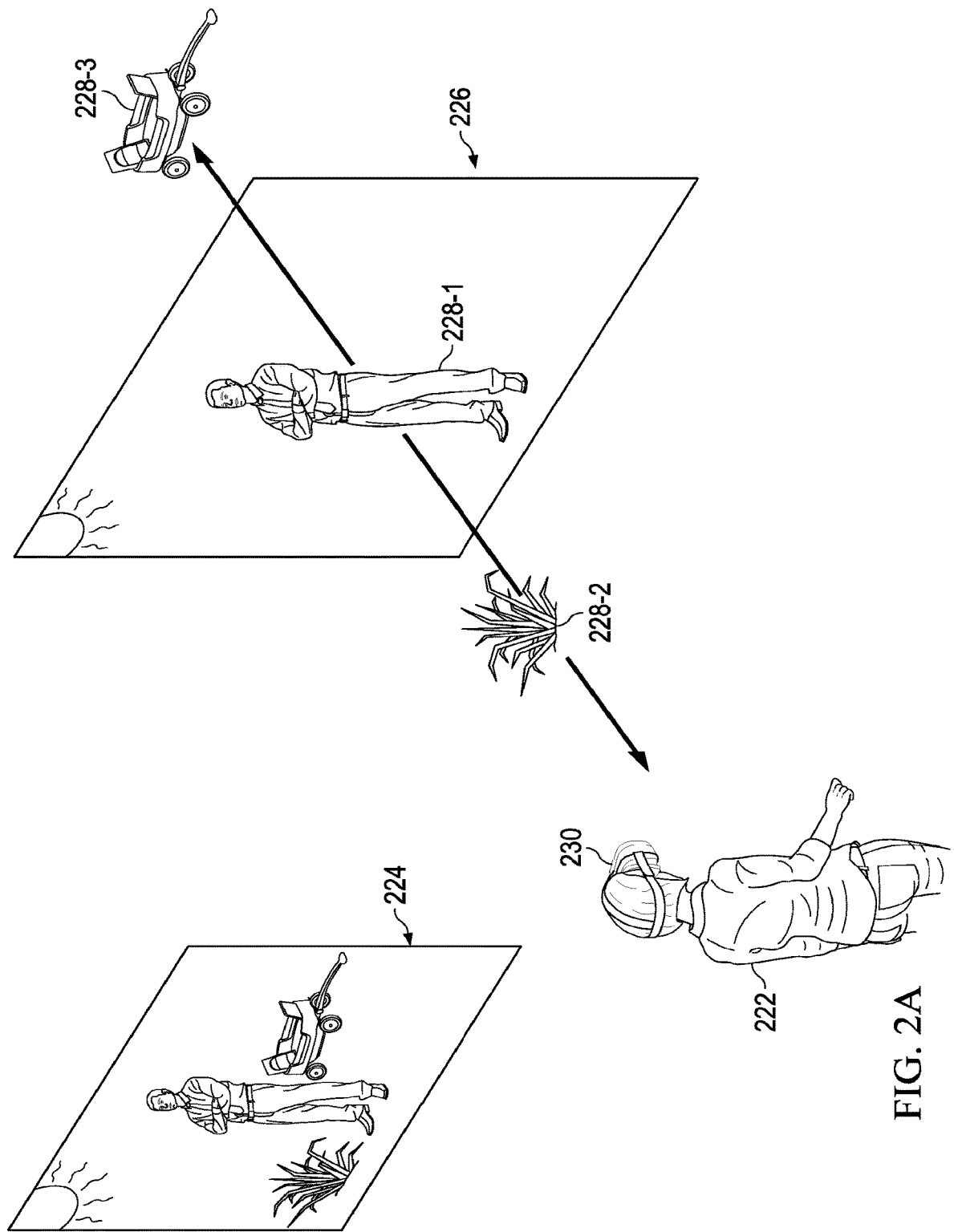

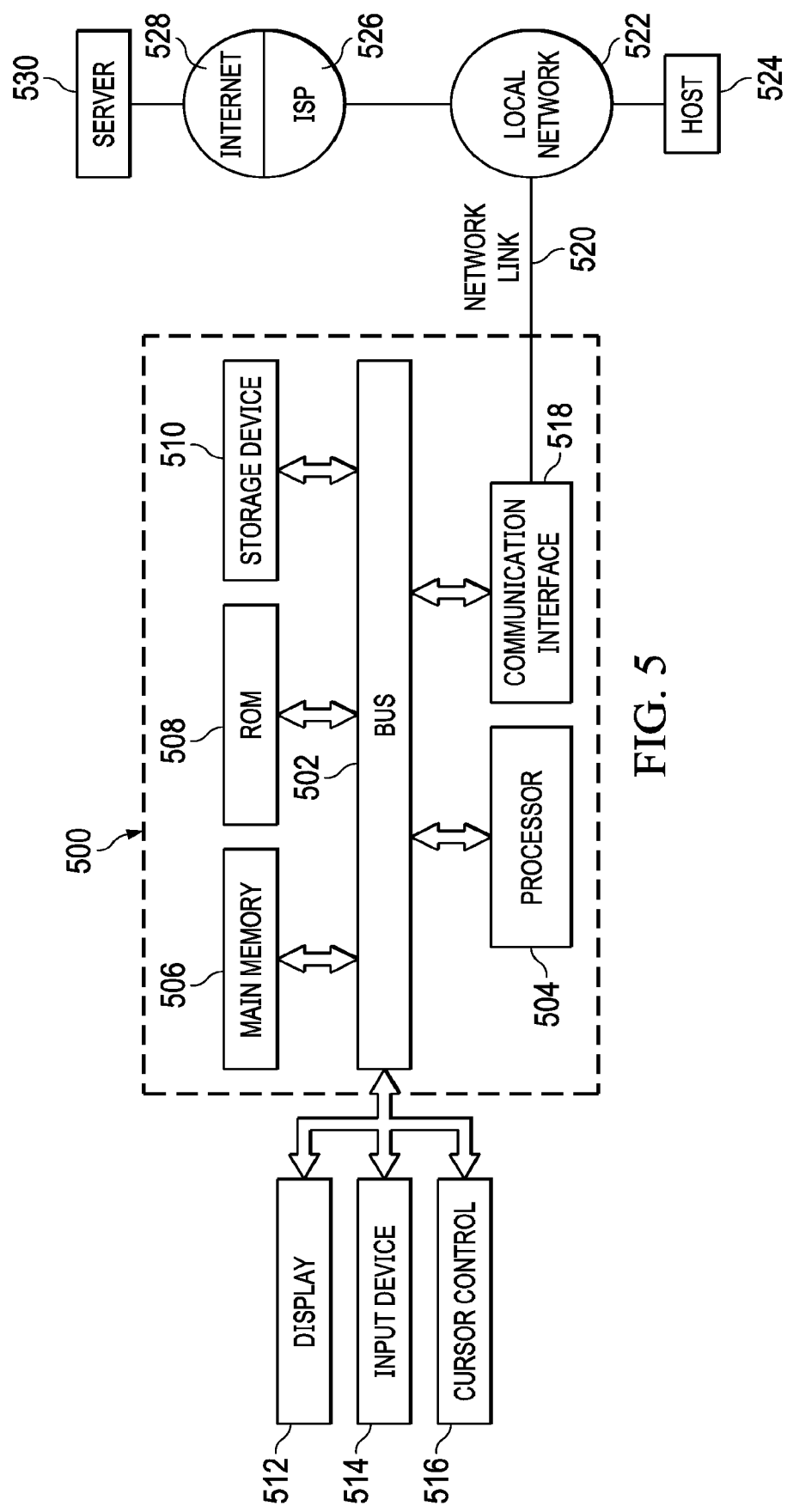

VIRTUAL REALITY CINEMA-IMMERSIVE MOVIE WATCHING FOR HEADMOUNTED DISPLAYS

CROSS REFERENCE TO RELATED APPLICATIONS

This application claims priority to U.S. Provisional Application No. 62/753,777, filed Oct. 31, 2018, which is hereby incorporated by reference in its entirety.

TECHNOLOGY

The present invention relates generally to image coding and rendering, and in particular, to image coding related to virtual reality cinema-immersive movie watching for headmounted displays.

BACKGROUND

Regular content viewed on a virtual reality (VR) headset looks dull. Watching a traditional movie in VR presents the viewer with the worst of both worlds—lower resolution and lower display quality as compared with a high-end television—with none of the immersive features of VR to compensate.

Existing solutions for watching traditional content (such as from the Netflix app) in VR are very underwhelming. The content is shown to a user in a flat rectangle—which is only a portion of an overall virtual world, for example depicted with the user's headmounted display. The user is left watching a low-quality version of the original in the flat rectangle amid the overall virtual world presented to the users.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 2A illustrates example image depth data generated from a two-dimensional image.

FIG. 5 illustrates an example hardware platform on which a computer or a computing device as described herein may be implemented.

DESCRIPTION OF EXAMPLE EMBODIMENTS

Figure 1:
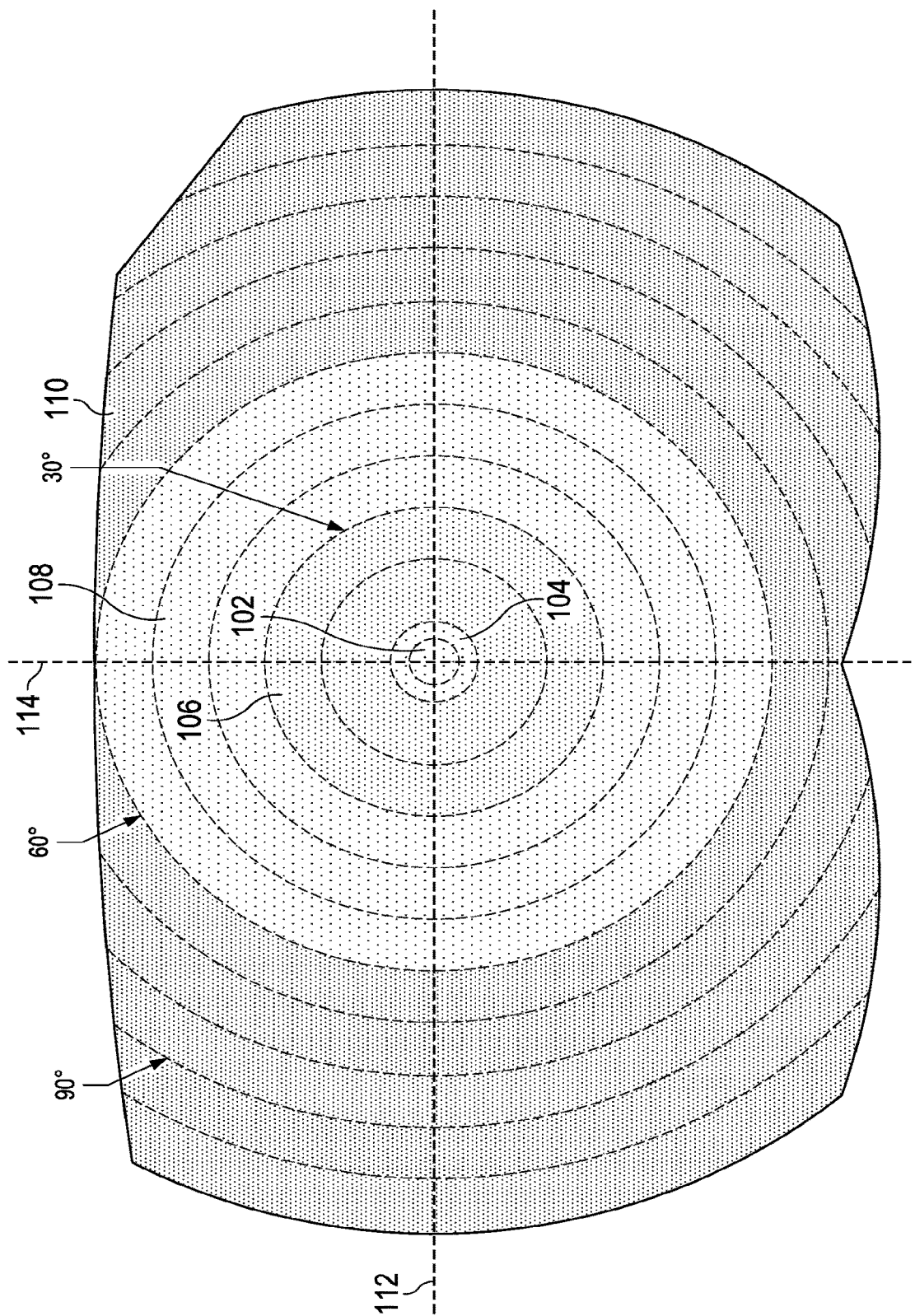
FIG. 1 illustrates an example representation of a vision field of an average viewer's eye.

Example embodiments, which relate to virtual reality cinema-immersive movie watching for headmounted displays, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. THE HUMAN VISION FIELD
3. VIEW DIRECTION TRACKING
4. PERIPHERAL-VISION EXPANDED IMAGES
5. EXAMPLE VIDEO STREAMING SERVERS AND CLIENTS
6. EXAMPLE PROCESS FLOWS
7. IMPLEMENTATION MECHANISMS—HARDWARE OVERVIEW
8. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Techniques as described herein can be implemented in various video applications to remap source images of limited fields of vision to (foveal-vision dependent) peripheral-vision expanded images. Each of the peripheral-vision-expanded images is generated from a corresponding source image in the source images of limited fields of vision based on a viewer's view direction determined or predicted for a corresponding time point. Each of the peripheral-vision-expanded images comprises a foveal-vision image portion that preserves or closely approximates spatial relationships as depicted in a corresponding source image and one or more peripheral-vision image portions that do not preserve but rather are spatially stretched to cover the viewer's entire or substantially entire peripheral vision field, for example as depicted in the viewer's headmounted display, (e.g., significantly, etc.) beyond what the corresponding source image could cover the viewer's peripheral vision field.

As used herein, the term "preserve" or "closely approximate" may mean that a foveal-vision image portion (e.g., 2 to 4-degree radius around the viewer's view direction, etc.) in a peripheral-vision-expanded image has depicted objects or image details with spatial relationships, geometries, distances, shapes, etc., comparable to those with which corresponding depicted objects or image details in a corresponding image portion in a corresponding source image used to derive the peripheral-vision-expanded image are depicted in the corresponding source image.

A video application as described herein may refer to any of: video display applications, VR applications, AR applications, automobile entertainment applications, remote presence applications, display applications, gaming applications, mobile applications (or mobile apps), internet-based video streaming applications (e.g., Netflix app, etc.), etc.

The techniques can be applied to virtual reality cinema-immersive movie watching (e.g., for headmounted displays, etc.) for streaming video data between video streaming server(s) and video streaming client(s). Example video content may include, but are not necessarily limited to, any of: audiovisual programs, movies, video programs, TV broadcasts, computer games, augmented reality (AR) content, virtual reality (VR) content, automobile entertainment content, etc. Example video streaming clients may include, but are not necessarily limited to, any of: display devices, a computing device with a near-eye display, a head-mounted display (HMD), a mobile device, a wearable display device, a set-top box with a display such as television, a video monitor, etc.

As used herein, a "video streaming server" may refer to one or more upstream devices that prepare and stream video content to one or more video streaming clients in order to render at least a portion (e.g., corresponding to a user's FOV or viewport, etc.) of the video content on one or more (target) displays. The displays on which the video content is rendered may be part of the one or more video streaming clients or may be operating in conjunction with the one or more video streaming clients. Example video streaming servers may include, but are not necessarily limited to, any of: cloud-based video streaming servers located remotely from video streaming client(s), local video streaming servers connected with video streaming client(s) over local wired or wireless networks, VR devices, AR devices, automobile entertainment devices, digital media devices, digital media receivers, set-top boxes, gaming machines (e.g., an Xbox), general purpose personal computers, tablets, dedicated digital media receivers such as the Apple TV or the Roku box, etc.

Peripheral-vision-expanded video content as described herein can be transmitted to, and used by, a recipient device for rendering that supports cinema-immersive video watching experience with correct spatial relationships of depicted objects and/or image details wherever the (human) viewer directs view directions. The viewer's view directions can be tracked by any combination of view direction tracking methods including but not limited to gaze tracking, viewport tracking, FOV tracking, viewer position tracking, face tracking, or any other view direction tracking methods.

View direction data to track the viewer's view directions is collected while the viewer is viewing the peripheral-vision-expanded images or a derivative version thereof (e.g., display images generated from the peripheral-vision-expanded images by a video rendering device or a video decoder operating in conjunction with the video rendering device, etc.). Example view direction data may include, without limitation, linear displacements, angular displacements, linear motions or translations, angular motions or rotations, pitch, roll, yaw, sway, heave, surge, up to six degrees of freedom, etc., that may be collected by any combination of gaze tracking devices, position tracking devices, viewport tracking devices, face tracking devices, FOV tracking devices, etc. The viewer's view directions at a plurality of time points may be determined. The viewer's view directions can be (e.g., additionally, optionally, alternatively, etc.) used on the recipient device itself to generate new views by implementing some or all techniques as described herein on the recipient device (or a device operating in conjunction with the recipient device) until the upstream devices respond with new data. The viewer's view directions can also be fed back to upstream devices (or a device operating in conjunction with the upstream device) to generate, from the source images, specific peripheral-vision-expanded images in reference to the viewer's view directions.

As used herein, a peripheral-vision-expanded image refers to an image in which only a region or image portion covering the viewer's vision field (e.g., sufficiently covering the viewer's foveal-vision, covering 100%, 50%, 20%, 10%, 5%, etc., more than the viewer's foveal-vision, etc.) is given image data of depicted objects and/or image details that preserve or closely approximate original spatial relationships, original geometries, original distances, original shapes, etc., as depicted in a corresponding source image, while image data covering other regions of the viewer's vision field can be (e.g., greatly, etc.) stretched and even distorted (e.g., through reverse fisheye mapping, conformal mapping, etc.) with peripheral-vision depicted objects and/or image details that do not preserve original spatial relationships, original geometries, original distances, original shapes, etc., as depicted in a corresponding source image.

Instead of sending (e.g., relatively uniform, etc.) high-quality images with large data volumes throughout the viewer's viewport of the viewer's image display, the specific peripheral-vision-expanded images generated in reference to the viewer's view directions can comprise much less data volumes by sending relatively low image qualities in the viewer's peripheral vision fields as depicted in the viewer's viewport of the viewer's image display.

For example, to reduce bandwidth usages, dynamic ranges in (e.g., specific to, etc.) peripheral-vision image portions may be (spatially variably) clipped or greatly compressed in a peripheral-vision-expanded image. Dynamic ranges may be the greatest in the viewer's foveal vision and (e.g., gradually) reduced from near-foveal vision to far peripheral vision in the viewer's vision field.

Additionally, optionally or alternatively, spatial resolutions may be (spatially variably) reduced in the peripheral-vision-expanded image. Spatial resolutions may be the greatest in the viewer's foveal vision and (e.g., gradually) reduced from near-foveal vision to far peripheral vision in the viewer's vision field.

Additionally, optionally or alternatively, color accuracies/precisions may be (spatially variably) reduced in the peripheral-vision-expanded image. Color accuracies/precisions may be the greatest in the viewer's foveal vision and (e.g., gradually) reduced from near-foveal vision to far peripheral vision in the viewer's vision field.

Additionally, optionally or alternatively, faithful or high-fidelity representations of depicted objects, image details, spatial relations thereof, etc., may be (spatially variably) reduced in the peripheral-vision-expanded image. Faithful or high-fidelity representations of depicted objects, image details, spatial relations thereof, etc., may be the greatest in the viewer's foveal vision and (e.g., gradually) reduced from near-foveal vision to far peripheral vision in the viewer's vision field.

Instantaneous flashes, pulsating or abrupt changes in light levels of the viewer's peripheral vision may be dampened or smoothened in some circumstances. Stretching operations in the viewer's peripheral vision may implement a smoothening process to allow spatial distortions introduced by the stretching operations in the viewer's peripheral vision to smoothly transition (e.g., relatively slowly go up, relatively slowly go down, etc.) from near foveal vision spatial regions of a peripheral-vision-expanded image to far peripheral vision spatial regions of the same peripheral-vision-expanded image.

Techniques as described herein can be used to allow a user of a downstream recipient device to freely vary the user's viewing angles or fields of view to display or rendered images generated from peripheral-vision-expanded images as described herein from a video streaming server. In most if not all operating scenarios, the user can be presented with focal-vision video content with the most faithful or the highest fidelity depicted objects and/or image details for a seamless viewing experience that is relatively free from visual artifacts, physiological discomforts, etc., associated with some other approaches that do not adopt the techniques as described herein. The visual artifacts, physiological discomforts, etc., associated with the other approaches may include, but are not necessarily limited to, any of: motion artifacts such as unable to maintain smooth pursuit, prolonged lags in transitioning to fine image details as perceived by the human vision, coarse image details noticeable within a focal viewing area of the human vision, mismatches between a user's natural vision-related intuition and video content as actually rendered to the user, sudden drop of levels of image details when a viewer moves viewing angles, perceptible slow transitioning from coarse image details to fine image details, showing fuzzy images for previously occluded image details when a viewer moves viewing angles, etc.

Spatially differentiated image metadata portions may be generated for different image portions for a source image as described herein. A recipient video decoding device that receives the source image and the image metadata portions can use the image metadata portions to perform respective stretching operations (including but not limited to attendant image processing operations and/or other image processing operations) on the image portions of the source image to generate a corresponding peripheral-vision-expanded image and/or a corresponding display image to be rendered on one or more target displays operating in conjunction with the recipient video decoding device. Example target displays may include, without limitation, headmounted displays, AR displays, VR displays, omni-vision displays, 360 degree displays, home theater displays, CAVE-type displays, etc.

In some example embodiments, mechanisms as described herein form a part of a media processing system, including but not limited to any of: cloud-based server, mobile device, virtual reality system, augmented reality system, head-mounted devices, headmounted displays, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the embodiments and the generic principles and features described herein will be readily apparent to those skilled in the art. Thus, the disclosure is not intended to be limited to the embodiments shown, but is to be accorded the widest scope consistent with the principles and features described herein.

2. The Human Vision Field

Techniques as described herein can be implemented based on the knowledge of the (human) eye and how the eye perceives luminance, colors, spatial resolution, etc. These techniques may be applied based on the individual viewer's specific vision characteristics or a user population's average or collective vision characteristics.

FIG. 1 illustrates an example representation of a vision field of an average viewer's eye. Cone and rod distributions (in the eye) can be segmented into different distribution ranges of cones and rods and further projected into an angular vision field representation (of the eye) as illustrated in FIG. 1. Highest levels of visual perception are achieved in the eye's foveal (vision field) region 102.

By way of example but not limitation, the widest angular range in the eye's vision field is along the horizontal direction of FIG. 1, which is parallel to the inter-pupil line between the viewer's two eyes, without considering visual constraints from facial anatomy, and may be approximately 180 angular degrees.

Each of concentric circles (e.g., labelled as 30°, 60°, 90°, etc.) represents directions of equal (or the same) angular degree relative to a view direction of the viewer's left or right eye. It should be noted that angles such as 30°, 60°, 90°, etc., are for illustration purposes only. Different values of angles or different set of angles can be used to define or describe a viewer's vision field. The view direction (not shown in FIG. 1) is pointed vertically out of the plane of FIG. 1 at the intersection of a transverse direction 112 and a vertical direction 114 in a foveal region 102 (the darkest fill pattern). Here, the transverse direction (112) and the vertical direction (114) form a plane vertical to the view direction.

As illustrated in FIG. 1, the vision field of the eye may be partitioned (e.g., logically, projected by certain partitions in the distributions of densities of rods/cones, etc.) into the foveal region (102) immediately surrounded by a paracentral region 104. In some embodiments, the foveal region (102) may correspond to the viewer's fovea vision and extend from zero (0) angular degree to a first angle (e.g., 2-4 angular degree, 3-7 angular degrees, 5-9 angular degrees, etc.) relative to the view direction. In some embodiments, the paracentral region (104) may extend from the first angle to a second angle (e.g., 6-12 angular degrees, etc.) relative to the view direction.

The paracentral region (104) is immediately surrounded by a near-peripheral region 106. The near-peripheral region (106) is immediately adjacent to the mid-peripheral region (108), which in turn is immediately adjacent to the rest of the vision field, a far-peripheral region 110. In some embodiments, the near-peripheral region (106) may extend from the second angle to a third angle (e.g., 25-35 angular degrees, etc.) relative to the view direction. In some embodiments, the mid-peripheral region (108) may extend from the third angle to a fourth angle (e.g., 50-65 angular degrees, etc.) relative to the view direction. The far-peripheral region (110) may extend from the fourth angle to the edge of the vision field.

The first, second, third and fourth angles used in this example logical partition of the vision field may be defined or specified along the transverse direction (112). When the vision field of FIG. 1 corresponds to that at a front level viewing direction, the transverse direction (112) may be the same as, or parallel to, the viewer's interpupil line.

It should be noted that different schemes of logically partitioning a viewer's vision field may be used in addition to, or in place of, the scheme of logically partitioning the viewer's vision field into foveal, paracentral, near-peripheral, mid-peripheral, far-peripheral, etc., regions based on angles as illustrated in FIG. 1.

For example, in some embodiments, the viewer's vision field may be partitioned into more or fewer regions such as a combination of a foveal region, a near-peripheral region and a far-peripheral region, etc., without a paracentral region and/or a mid-peripheral region. A spatially faithful representation (or high-fidelity) image portion may be used to cover from the foveal region up to some or all of the near-peripheral region in such logical partition of the viewer's vision field.

In some embodiments, the viewer's vision field may be partitioned based on other quantities other than angles as illustrated in FIG. 1. For example, in a non-limiting implementation, the foveal region may be defined as a vision field region that corresponds a viewer's foveal-vision. The paracentral region may be defined as a vision field region that corresponds a viewer's retina area where cone/rod densities exceed relatively high cone/rod density thresholds. The near-peripheral region may be defined as a vision field region that corresponds a viewer's retina area where cone/rod densities does not exceed relatively high cone/rod density thresholds respectively but does exceed intermediate cone/rod density thresholds. The mid-peripheral region may be defined as a vision field region that corresponds a viewer's retina area where cone/rod densities does not exceed intermediate cone/rod density thresholds respectively but does exceed relatively low cone/rod density thresholds. A focal-vision region as described herein may cover from the viewer's foveal-vision up to some or all of a region (e.g., some or all of the viewer's near-peripheral vision, etc.) based on threshold(s) (e.g., cone/rod density threshold(s), etc.) that are not necessarily angle-based.

Additionally, optionally or alternatively, a combination of two or more different schemes of logically partitioning the viewer's vision field and/or other human vision factors may be used to determine a focal-vision region of the viewer's vision field. For example, instead of using a focal-vision region as described herein to cover the same angular value range in different angular directions, the focal-vision region as described herein may cover a larger angular value range along the transverse direction (112) than an angular value range covered by the focal-vision region along the vertical direction (114), as the human vision system may be more sensitive to image details along the transverse direction (112) than those along the vertical direction (114).

In some embodiments, a focal-vision region as described herein covers some or all of: a foveal region (e.g., plus a safety margin, etc.), a paracentral region (e.g., excluding and extending from the foveal region, etc.), a near-peripheral region (e.g., further excluding and extending from the paracentral region, etc.), a mid-peripheral region (e.g., further excluding and extending from the near peripheral region, etc.), etc.

In some embodiments, a focal-vision region as described herein covers a symmetric angular range representing a symmetric (to the viewer's view direction) region of the wide angular range. Examples of the focal-vision region may include, but are not necessarily limited to, one of: +/−15 angular degrees, +/−20 angular degrees, +/−25 angular degrees, etc., relative to the viewer's view direction.

In some embodiments, a focal-vision region as described herein covers an asymmetric angular range representing an asymmetric (to the viewer's view direction) region of the wide angular range. An asymmetric angular range in a vision field of one eye may be defined or specified as covering from an interior angle (looking towards the other/conjugate eye) to an exterior angle (looking away from the other/conjugate eye).

In some implementation examples, the asymmetric angular range is biased with a preference towards interior directions overlapped in both vision fields of the viewer's left and right eyes. Examples of the interior angle of the asymmetric angular range with bias to interior angles may include, but are not necessarily limited to, one of: 15 angular degrees, 30 angular degrees, 45 angular degrees, etc., relative to the viewer's view direction. Examples of the exterior angle of the asymmetric angular range with bias to interior angles may include, but are not necessarily limited to, one of: 10 angular degrees, 15 angular degrees, 20 angular degrees, etc., relative to the viewer's view direction.

In some implementation examples, the asymmetric angular range is biased with a preference towards exterior directions which may or may not be overlapped in both vision fields of the viewer's left and right eyes. Examples of the exterior angle of the asymmetric angular range with bias to exterior directions may include, but are not necessarily limited to, one of: 15 angular degrees, 30 angular degrees, 45 angular degrees, etc., relative to the viewer's view direction. Examples of the interior angle of the asymmetric angular range with bias to exterior directions may include, but are not necessarily limited to, one of: 10 angular degrees, 15 angular degrees, 20 angular degrees, etc., relative to the viewer's view direction.

Additionally, optionally or alternatively, in some embodiments, a vision field of an eye as described herein takes into consideration vision-related factors such as eye swiveling, viewing constraints from nose, corneal, eyelid, etc.

Examples of a focal-vision region as described herein may include, but are not necessarily limited to, any combination of one or more of: circular shapes, oblong shapes, oval shapes, heart shapes, star shapes, round shapes, square shapes, polygonal shapes, etc.

3. View Direction Tracking

In some embodiments, only a (e.g., relatively small, etc.) focal-vision region of the eye's vision field needs to be provided with pixel values with the highest dynamic range, the widest color gamut, the highest (or sharpest) spatial resolution, etc. In some embodiments, the focal-vision region of the eye's vision field may correspond to (e.g., exactly, approximately, no less than 95% of, no more than 105% of, etc.) the entirety of the foveal-vision of the eye up to some or all of near-peripheral vision of the eye. In some embodiments, the focal-vision region of the eye's vision field may additionally include a safety vision field region.

In some embodiments, the size and/or shape of the safety vision field region in the focal-vision region can be preconfigured to a fixed size (e.g., 0%, 5%, 10%, −5%, −10%, etc.) that does not vary with network bandwidth, image content, types of computing devices (e.g., helmet mounted display devices, small form factor computing devices such as credit card size plugin devices, wall displays, etc.) involved in video applications, types of rendering environments (e.g., cloud-based video streaming servers, video streaming servers collocated with video streaming clients, video streaming servers connected with video streaming clients over local wireless connections, etc.) involved in video applications, etc.

In some other embodiments, the size and/or shape of the safety vision field region in the focal-vision region can be dynamically reconfigured at runtime, and can vary in a range (e.g., from −10% to 10%, from −5% to 5%, from 0% to 5-10%, etc.) with one or more of: network bandwidth, image content, types of computing devices (e.g., helmet mounted display devices, small form factor computing devices such as credit card size plugin devices, wall displays, etc.) involved in video applications, types of rendering environments (e.g., cloud-based video streaming servers, video streaming servers collocated with video streaming clients, video streaming servers connected with video streaming clients over local wireless connections, etc.) involved in video applications, etc.

For example, in response to determining that network connections do not support a relatively high bandwidth, the size and/or shape of the safety vision field region may be dynamically shrunk at runtime from 10% to 5% over the eye's foveal-vision. On the other hand, in response to determining that network connections supports a relatively high bandwidth, the size and/or shape of the safety vision field region may be dynamically expanded at runtime from 5% to 10% over the eye's foveal-vision.

The size and/or shape of the safety vision field region may also be set in dependence on latency in eye tracking. Additionally, optionally or alternatively, eye tracking data as described herein can be used to predict where the viewer would look next and reduce the bandwidth/safety region based on the prediction. For example, the user's view direction at runtime may be tracked by a view direction tracking device. The view direction tracking device may operate in real time with a display on which a sequence of display mapped images is rendered. As the user changes view directions and/or viewing distances from time to time, the view direction tracking device tracks and computes the viewing angles and/or viewing distances in a coordinate system in which the sequence of display mapped images is being rendered, generates a time sequence of view directions, and signals each view direction in the time sequence of view directions to a video streaming server as described herein. Each such signaled view direction of the viewer as received by the video streaming server may be indexed by a time point value. The time point value may be associated or correlated by a video streaming server as described herein with a specific peripheral-vision expanded image in a sequence of peripheral-vision expanded images that are used by a video decoder to generate the sequence of display mapped images.

View direction data may be collected, analyzed and/or shared/transmitted among view direction tracking devices and streaming devices with relatively low latency (e.g., within a fraction of one image frame time, within 5 milliseconds, etc.). In an example implementation, the view direction tracking data may be shared among these devices using the lowest latency data/network connections where multiple data/network connections are available.

In response to determining the viewer's view direction relatively expeditiously with relatively low latency (e.g., within a fraction of an image frame time, etc.) based on the view direction data, a video streaming server (e.g., implemented with one or more upstream devices, etc.) may dynamically shrink the size and/or shape of the safety vision field region at runtime from 10% to 5% over the eye's foveal-vision. A relatively small area (e.g., within 20 angular degrees from the view direction, etc.) of the highest dynamic range, the widest color gamut, the highest spatial resolution, etc., may be sent in the video signal to the downstream recipient device.

On the other hand, in response to determining the viewer's view direction relatively slowly with relatively high latency (e.g., exceeding a time threshold, more than the fraction of one image frame time, longer than 5 milliseconds, etc.) based on the view direction data, the video streaming server may dynamically expand the size and/or shape of the safety vision field region at runtime from 1% to 3%, 2% to 6%, 5% to 10%, etc., over the eye's foveal-vision. A relatively large area (e.g., up to 30 angular degrees from the view direction, etc.) of the highest dynamic range, the widest color gamut, the highest spatial resolution, etc., may be sent in the video signal to the downstream recipient device. That way, the recipient device of the video signal can have sufficient image data over a relatively large focal-vision region to make local decisions based on the view directions for image rendering purposes.

HDR source images as described herein can be captured/generated with one or more camera systems deployed in one or more spatial environments. Example spatial environments may include, but are not limited to only, any of: physical spatial environment, simulated spatial environment, movie studios, outdoor scenes, indoor scenes, tunnels, streets, vehicles, ships, aircrafts, outer space, etc. Example camera systems may include, but are not limited to only, any of: light field cameras, multiple cameras with overlapping and/or non-overlapping fields of vision, digital cameras, analog cameras, webcams, virtual cameras in game rendering engines, etc.

As used herein, an HDR source image may represent one individual HDR source image image in a sequence of HDR source images. A video streaming server may be configured to receive and use the received sequence of HDR source images as input to prepare peripheral-vision expanded video content for streaming to (downstream) video streaming clients in support of one or more of: video display applications, VR applications, AR applications, automobile entertainment applications, remote presence applications, display applications, etc.

An image (e.g., a source image, a peripheral-vision expanded image, a display mapped image, etc.) as described herein can be represented in any of a wide variety of coordinate systems such as a World coordinate system, a coordinate system stationary to a camera system, a coordinate system fixed relative to a spatial environment, etc. A spatial position in the image may be either an absolute position (e.g., represented in the World coordinate system, etc.) or a relative position (e.g., represented in a relative coordinate system stationary to the camera system, etc.).

In some embodiments, a spatial position (e.g., a pixel, etc.) in the image can be represented by a set of specific (x, y) coordinate values. By way of example but not limitation, the x coordinate value of the specific (x, y) coordinate values may correspond to a specific longitudinal degree (ranging from 0 to 360 angular degrees) in the image representation in a 3D space, whereas the y coordinate value of the (x, y) coordinate values may correspond to a specific latitudinal degree (ranging from 0 to 180 angular degrees) in the image representation in the 3D space. In various embodiments, geometric transformations can be used to transform a set of (e.g., x, y) coordinate values of a spatial position in one image representation into another set of (e.g., pitch, roll, yaw, sway, heave, surge, etc.) coordinate values of the same position in other image representations, etc.

4. Peripheral-Vision Expanded Images

Figure 3A:
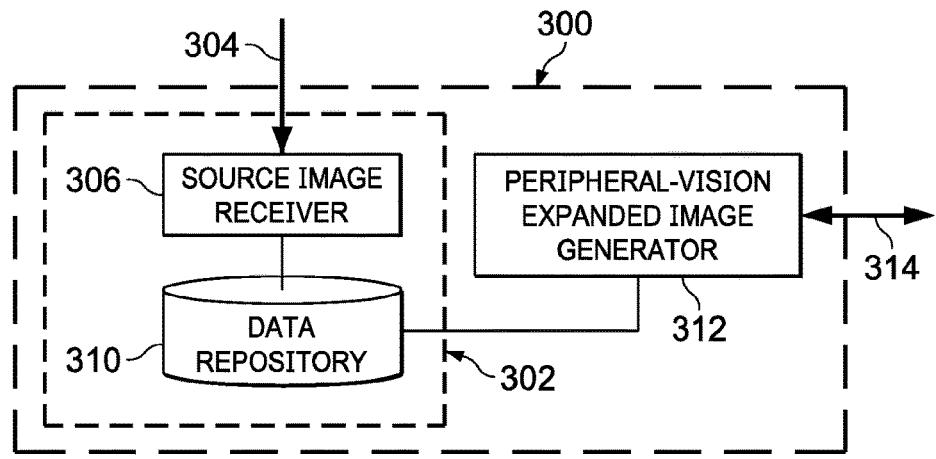
FIG. 3A through FIG. 3C illustrate example video streaming servers and clients.
Figure 3B:
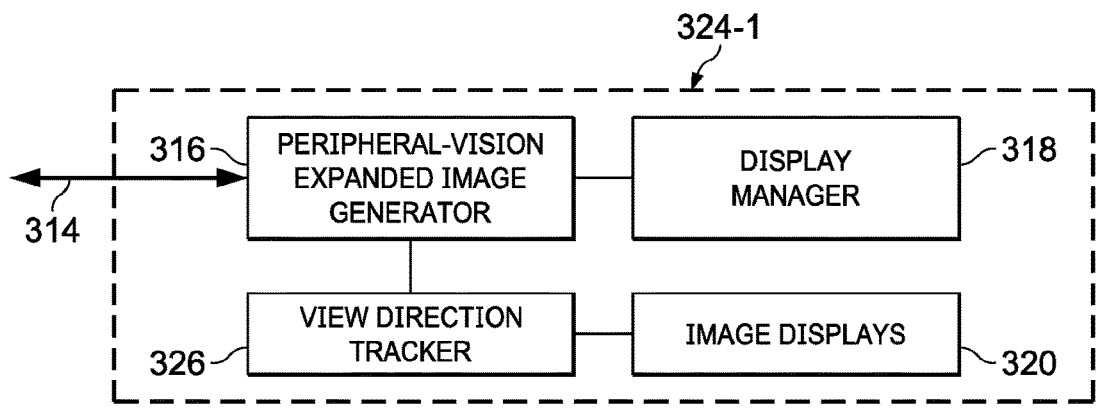
Figure 3C:
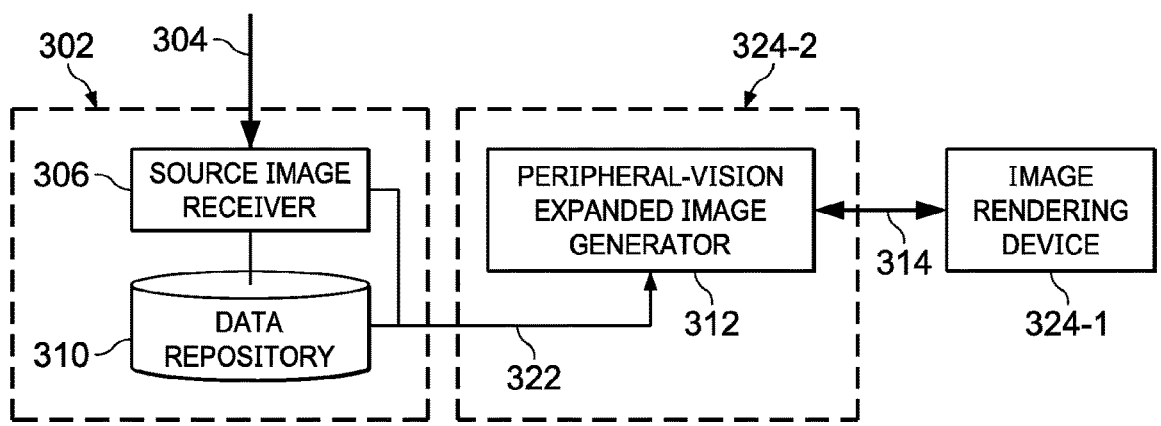

In some embodiments, an image processing device (e.g., a peripheral-vision expanded image generator 312 of FIG. 3A or FIG. 3C, a computing device operating in conjunction with the peripheral-vision expanded image generator (312), etc.) under techniques as described herein adapts content (including but not limited to traditional content) such as objects and/or image details depicted in source images to present the adapted content in a manner especially suited to VR presentation, AR presentation, etc., thereby creating cinema-immersive experiences for viewers.

The image processing device may comprise a number of system components such as subsystems or devices each of which may be implemented at least in part through hardware (e.g., computer processors, non-transitory media, digital signal processors, ASICs, FPGAs, ICs, SoC, etc.). Example system components may include, but are not necessarily limited to only, any of: system components implementing automatic or semi-automatic 2D-to-3D conversion method/algorithm/process/procedure, etc.

In many operational scenarios, viewing display (or rendered) images with a video application such as a VR application, an AR application, an omnidirectional video application, etc., represents a stereoscopic (or multi-view) experience.

For example, in operational scenarios in which 3D versions of films are available, display (or rendered) images derived from the films can be rendered and viewed in stereo 3D.

However, in operational scenarios in which 3D versions of films are not available, an automatic or semi-automatic 2D-to-3D conversion method/algorithm/process/procedure implemented by the image processing device can be employed to obtain a 3D version of adapted images generated by adapting a 2D version of source images in the films.

FIG. 2A illustrates example image depth data (or image depth map) 226 generated from a two-dimensional (2D) image 224, for example in a 2D version of a film or a media program. The 2D-to-3D conversion method/algorithm/process/procedure of the image processing device may implement depth map extraction, image warping, etc., to generate the image depth data (226).

As illustrated in FIG. 2A, the depth data (226) may comprise one or more depth data portions for one or more depicted objects and/or image details in the 2D image (224).

For example, a first depth data portion in the depth data (226), as generated by the 2D-to-3D conversion method/algorithm/process/procedure, may identify a first depicted object or image detail (e.g., a human figure, etc.) as located at a first depth (e.g., coplanar with a zero-parallax plane, etc.) from a viewer 222 along a view direction (e.g., a frontal view direction of the viewer's headmounted device 230 (e.g., with a headmounted display, etc.), an eye gaze direction of the viewer 222, etc.).

A second depth data portion in the depth data (226), as generated by the 2D-to-3D conversion method/algorithm/process/procedure, may identify a second depicted object or image detail (e.g., a plant, etc.) as located at a second depth (e.g., a specific distance in front of the zero-parallax plane, etc.) from the viewer (222) along the view direction.

A third depth data portion in the depth data (226), as generated by the 2D-to-3D conversion method/algorithm/process/procedure, may identify a third depicted object or image detail (e.g., a wagon, etc.) as located at a third depth (e.g., a specific distance behind the zero-parallax plane, etc.) from the viewer (222) along the view direction.

Additionally, optionally or alternatively, some or all of the depth data (226) may be rectified based at least in part on individual inter-pupil distance (IPD) information and personalized for the viewer (222). Example individual IPD information may indicate whether the viewer has an average IPD, a smaller IPD, a larger IPD, etc., as compared with a viewer population.

In many operational scenarios, video presentation in a video application such as a VR application, an AR application, etc., is done as a "flat" virtual screen in the virtual world depicted in the video application.

In operational scenarios in which curved versions of source images are not available, an automatic or semi-automatic flat-to-curved image conversion method, algorithm, process, procedure, tool, etc., implemented by the image processing device can be employed to obtain a curved version of adapted images generated by adapting the flat-image version of the source images.

Figure 2B:
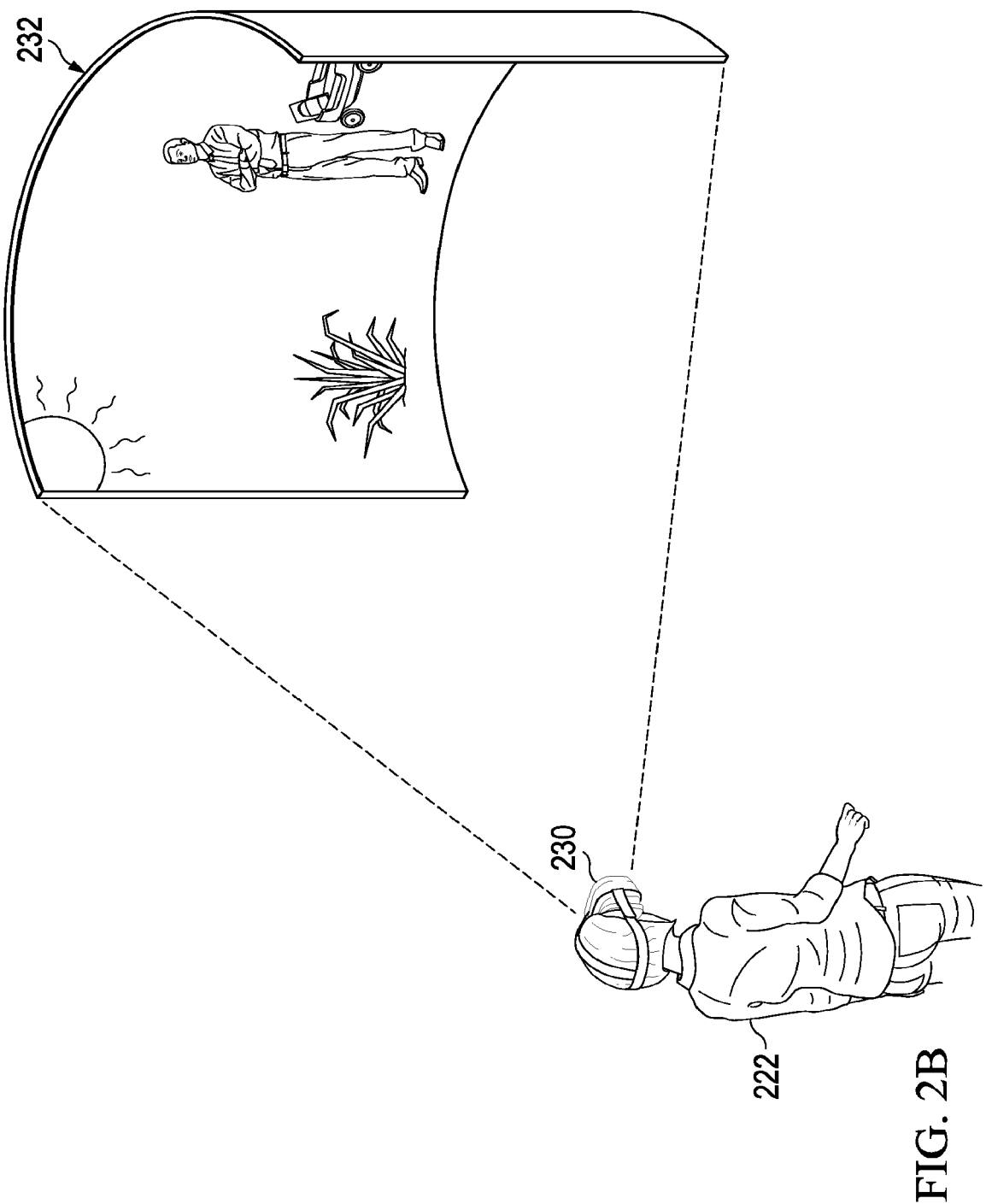
FIG. 2B illustrates example curved image generated from a flat image.

FIG. 2B illustrates example curved image 232 generated from a flat image (e.g., the 2D image (224) of FIG. 2A, etc.), for example in the flat image version of the source images. In some embodiments, the generated curved image (232) may cover the entire (or substantially entire) field of view (e.g., 120-degree field of view, 240-degree field of view, 360-degree field of view, etc.) as supported by the viewer's headmounted device (230).

Curved images (e.g., 232, etc.) generated under techniques as described herein may be displayed/rendered to result in a cinema-immersive experience—which may, but is not limited to, be delivered by way of the viewer's headmounted device (230)—similar to that with a physical curved display such as a Dolby cinema display, an IMAX display, a high-end home theater display, a television/gaming display, and so forth. Curved images, or images adapted to a curved (e.g., virtual, real, etc.) screen or image display support a relatively high-quality viewing experience by minimizing distortion for the viewer as if the viewer is (e.g., always, etc.) guaranteed to be seated at a relatively ideal viewing location in relation to the virtual or real screen or image display.

A headmounted device such as a VR headset, etc., may encompass a large field of view of a viewer, significantly more than that in a traditional home theater experience. Techniques as described herein can implement image rendering/presentation methods for presenting images to the viewer in a manner that mimics a home theater experience. These images can be presented in an immersive setting that encompasses nearly all of the viewer's field of view, as supported by the viewer's headmounted device, to enhance cinema level immersion within the virtual world as depicted through the viewer's headmounted device.

In some operational scenarios, some depicted objects and/or image details, such as relatively significant or important elements (e.g., depicted objects, image details, etc.) of a depicted scene, may be placed on the periphery of the viewer's vision field (or visible zones), or even outside the viewer's vision field, depending on the viewer's head position.

The image processing device, or a device operating in conjunction therewith, may perform image stretching operations to non-linearly distort one or more image portions of a source image to generate a corresponding peripheral-vision expanded image in such a way that vision field areas central to the viewer's attention (e.g., the viewer's foveal vision, the viewer's focal vision, etc.) are not affected, but peripheral zones in the viewer's vision field are stretched to cover more areas than what are supported by the source image. A result is that the viewer's peripheral vision field portions as supported by the viewer's headmounted device (230) are covered with image content, thereby generating an immersive feeling. The non-linear distortion can be attributed to the non-linear cone/rod distribution of the viewer's eye or vision field. As such when travelling away from the foveal region, the acuity/HDR/Color/pixel depth of an image can be slowly distorted or varied based on different locations of images that correspond to different regions of near/mid/far peripheral visions.

While image content in the peripheral-vision expanded image is distorted to some extent, for example in the viewer's peripheral vision field portions, distortions may not be noticeable since the distortions are located on the periphery of the viewer's vision where the human visual system may not be able to distinguish in detail.

In response to determining that the viewer's gaze and/or view position shift to a zone that was previously in the periphery, the image processing device may generate new peripheral-vision expanded images that display newly focused areas undistorted, while distorting zones that are now located in the periphery of the viewer's vision, thereby maintaining and continuing to support a cinema-immersive experience.

Image stretching operations as described herein may implement any in a variety of image distortion/expansion methods, algorithms, procedures, tools, and so forth. Example image distortion/expansion operations may, but are not necessarily limited to only, include one or more of: image distortion/expansion based on reversed fish-eye lens correction, image distortion/expansion using a horizontal plane (e.g., only, etc.), image distortion/expansion using projective techniques, image distortion/expansion based on geometrical mappings such as conformal mappings, etc.

The viewer's gaze or view direction can be tracked through a gaze tracking device operating within or in conjunction with the viewer's headmounted device (230).

Techniques as described herein can be implemented to computationally retarget and enhance (e.g., existing, newly generated, etc.) video content by a carefully selected gaze-guided (e.g., projective, etc.) distortion to generate a larger, curved field of view to cover a relatively large field of view up to omnidirectional field of view. Depicted objects and/or image details in resultant peripheral-vision expanded images may be segmented in spatial depths by way of 2D to 3D conversion. Additionally, optionally or alternatively, depth information as described herein can be used to determine or detect whether objects in a peripheral region of an image has depth data indicating that those objects are far off. If that is the case, then the amount of deterioration in acuity/HDR/Color/pixel depth in that peripheral region of the image may be increased. Thus, distortion may be added or reduced based on depth information. The depth information may be used for segmenting images and then compressing the segmented images. The depth information also may be used for classifying regions of images and then distorting some of the regions of the images.

Figure 2C:
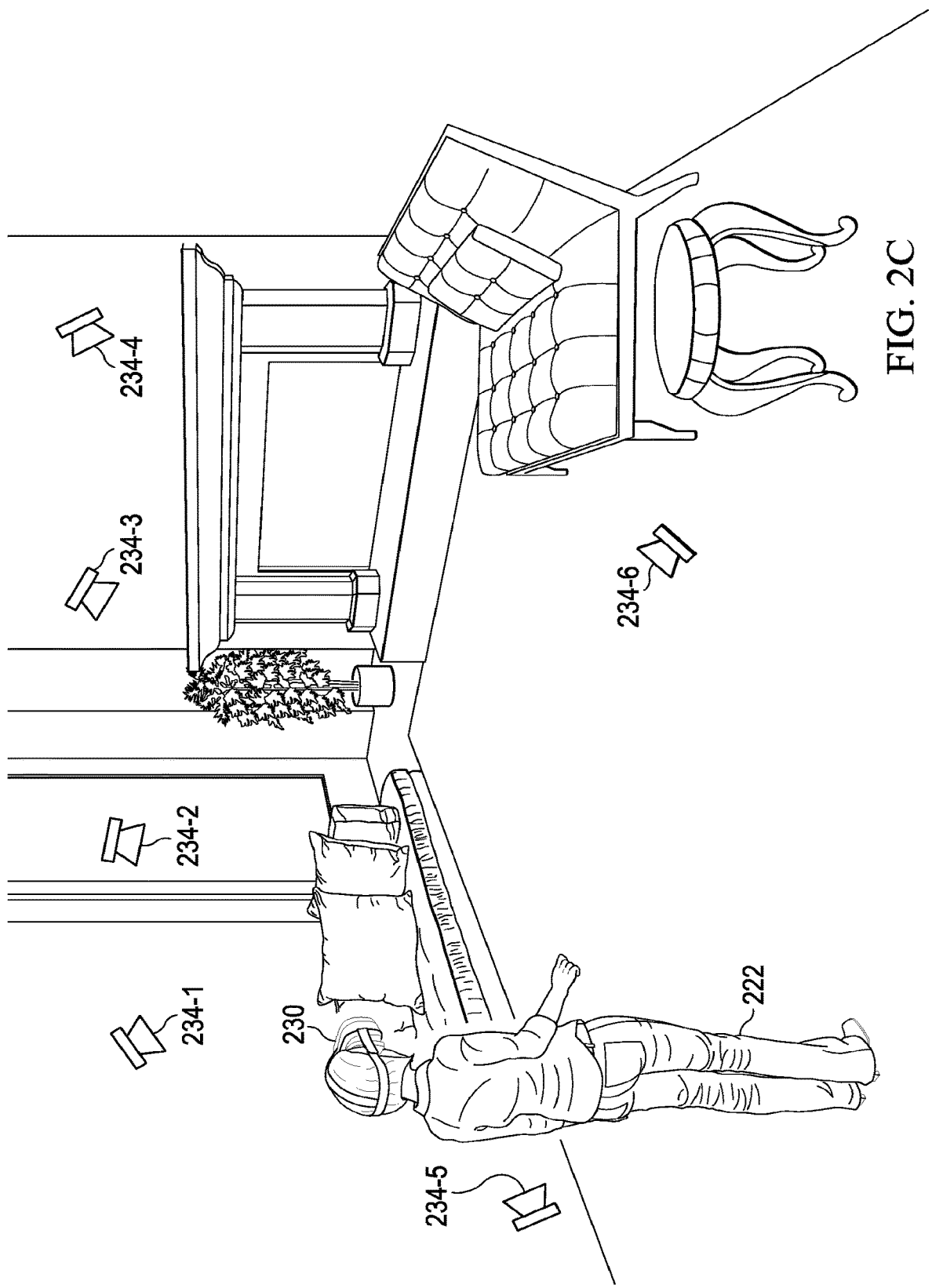
FIG. 2C illustrates an example audio rendering environment in which sound source rendering can be retargeted for peripheral-vision expanded video content.

In some embodiments, as illustrated in FIG. 2C, based on new positions of the depicted objects and image details in the peripheral-vision expanded images and head tracking of the viewer, sound sources in one or more scenes as represented in the peripheral-vision expanded images can be retargeted to match the viewer's view of the scenes and spatial relationships between the viewer's position and view direction and new (or retargeted) sound source positions as represented in the peripheral-vision expanded images.

In some embodiments, an audio rendering system may operate within the viewer's headmounted device (e.g., implementing binaural rendering techniques, etc.) or in conjunction with the headmounted device. The audio rendering system may comprise one or more speakers 234-1 through 234-6 to render sounds accompanying the rendering/displaying of the peripheral-vision expanded images. The audio rendering system may implement corresponding audio source position adaptation operations to render the sound sources according to the viewer's position and view direction as well as matching the new (or retargeted) sound source positions that correspond to retargeted objects and/or image details as represented in the peripheral-vision expanded images. As a result, the peripheral-vision expanded images present to the viewer by way of the viewer's headmounted device (230) and the audio rendering system with a relatively large (or enhanced) field of view, immersive stereo or multi-view images, a (virtual or real) screen of curvature, realistic/immersive audio.

Figure 2D:
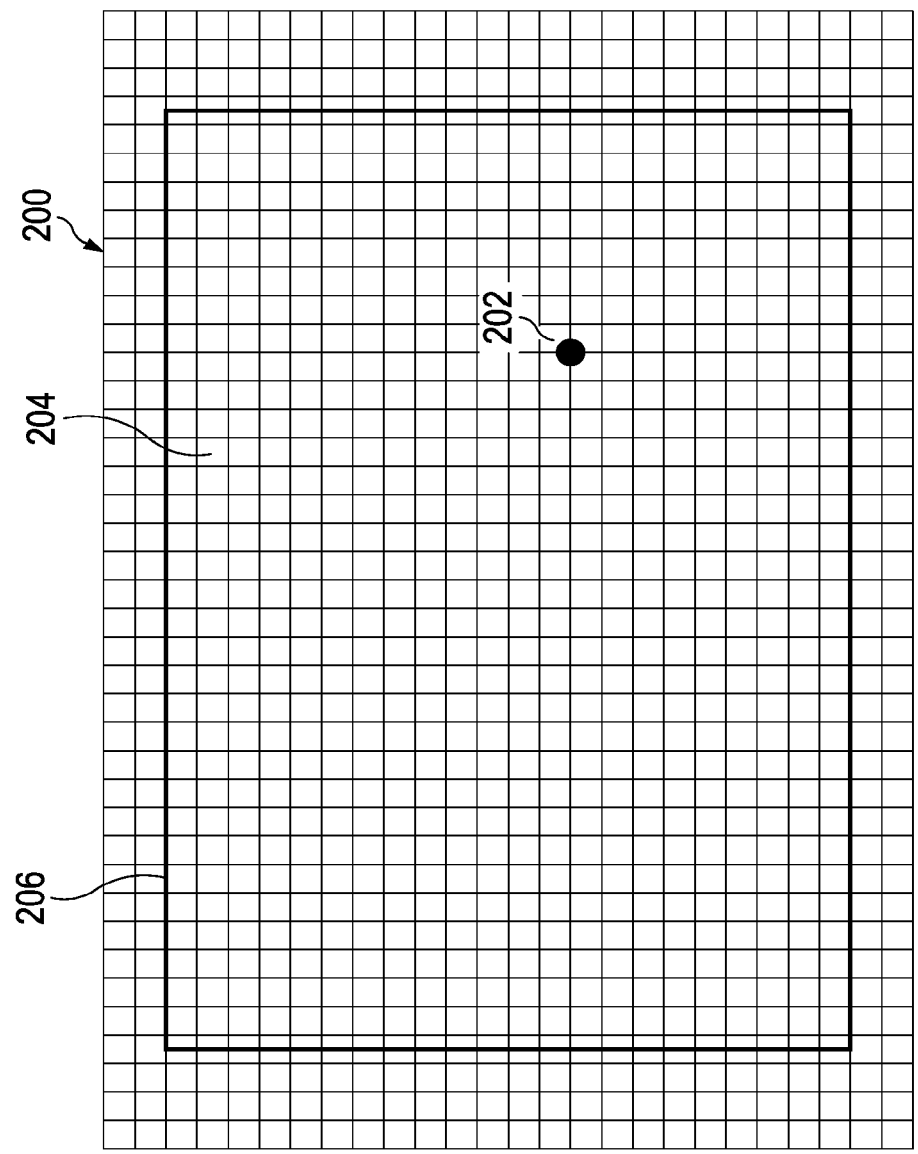
FIG. 2D illustrates an example peripheral-vision expanded image.

FIG. 2D illustrates an example peripheral-vision expanded image 200. The peripheral-vision expanded image (200) comprises multiple image portions that are adapted from multiple corresponding image portions in a corresponding source image. Instead of directly encoding the source image, the peripheral-vision expanded image (200) is encoded into a video signal that can be transmitted from one or more upstream devices (e.g., video streaming server(s), etc.) to a downstream recipient device (e.g., a video streaming client, etc.).

An image portion in an image as described herein may logically represent an image frame containing a set of pixel values at a set of pixels (or positions). Individual shapes (e.g., rectangle, polygonal shapes, regular shapes, irregular shapes, etc.) and individual sizes of image portions and/or corresponding buffers used to store the image portions may be reshaped or resized dynamically, for example, based on one or more of: network latencies, bandwidths, view direction movements, image content, etc. At the one or more upstream devices and/or at the recipient device, each image portion (or each image frame) in the peripheral-vision expanded (200) may, but is not limited to only, be kept in a respective memory buffer in a plurality of memory buffers that stores the peripheral-vision expanded image (200).

In some embodiments, some or all of the memory buffers may be refreshed collectively with a common frame rate. In some embodiments, at least some of the memory buffers may be refreshed individually with their own frame rates. In some embodiments, image data in different memory buffers as described herein may be compressed collectively, individually or separately. In some embodiments, different memory buffers storing different image layers may be located in different computing devices of one or more content delivery networks, one or more content distribution networks, one or more core networks, one or more access networks, etc.

For example, a memory buffer storing a focal-vision image portion of a peripheral-vision expanded image may be kept relatively close (e.g., geographically, in network topology, in the same network, in the same service-provider network, in an access network, via a local WIFI or wireline network/data connection, over relatively few network hops, etc.) to the recipient device. Another memory buffer storing a non-focal-vision image portion of the peripheral-vision expanded image may be kept relatively further way (e.g., geographically, in network topology, in different networks, in different service-provider networks, in a core network, via one or more remote network/data connections, over relatively numerous network hops, etc.) from the recipient device.

The peripheral-vision expanded image (200) may comprise a focal-vision image portion 202 that covers a focal-vision region of the viewer's vision field. In some embodiments, the focal-vision image portion (202) covers a focal-vision region (e.g., completely, substantially within a + or −5% safety margin, etc.) that corresponds to an innermost portion (e.g., 50%, 70%, 90%, etc.) of the viewer's foveal-vision. In some embodiments, the foveal-vision image portion (202) covers a focal-vision region (e.g., completely, substantially within a + or −5% safety margin, etc.) that corresponds to the viewer's foveal-vision and some or all of the viewer's near-peripheral vision.

Image data in the focal-vision image portion (202) may be cached and served out at a relatively high data rate to the downstream recipient device at upstream devices, content serving nodes, content caching nodes, etc., that are relatively close in spatial proximity or network topology proximity to the downstream recipient device. The focal-vision image portion (202) may be of no distortion or the least distortion in comparison with a corresponding image portion (of the source image) from which the focal-vision image portion (202) is derived. Additionally, optionally or alternatively, the focal-vision image portion (202) comprise pixel values of depth data portions of the highest accuracy and fidelity and the least spatial distortion, the highest dynamic range, the widest color gamut, the highest spatial resolution, etc., as transmitted in a video signal from one or more upstream devices (e.g., cloud-based video streaming server(s), a set-top box, a local video streaming server, any combination of one or more of the foregoing, etc.).

The peripheral-vision expanded image (200) may comprise a peripheral-vision image portion 204 that cover a peripheral-vision region in the viewer's vision field outside the focal-vision region. Image data in the peripheral-vision image portion (204) may be cached and served out at a relatively low data rate to the downstream recipient device at upstream devices, content serving nodes, content caching nodes, etc., that are relatively far in spatial proximity or network topology proximity to the downstream recipient device. The peripheral-vision image portion (204) may be of (e.g., spatially varying, from the least to the most significant, etc.) distortions in comparison with a corresponding image portion (of the source image) from which the peripheral-vision image portion (204) is derived. Additionally, optionally or alternatively, the peripheral-vision image portion (204) may comprise pixel values of depth data portions of relatively low accuracy and fidelity and relatively significant spatial distortion, relatively low dynamic range(s), relatively narrow color gamut(s), relatively low spatial resolution(s), etc., as transmitted in the video signal from one or more upstream devices (e.g., cloud-based video streaming server(s), a set-top box, a local video streaming server, any combination of one or more of the foregoing, etc.).

In some embodiments, the focal-vision image portion (202) and the peripheral-vision image portion (204) may cover the viewer's viewport 206 as supported by the viewer's headmounted device (e.g., 230 of FIG. 2A and FIG. 2B, etc.) in reference to the viewer's view direction determined or predicted for the time point.

As used herein, a viewport may refer to a total display area (or a total image rendering surface) available from one or more image displays (or one or more target displays) of a viewer on which a display image generated from the peripheral-vision expanded image (200) is rendered. The peripheral-vision expanded image (200) in reference to the viewer's view direction determined or predicted for the time point may cover an image field (e.g., immersive, panorama, 360-degree view, much, etc.) larger than the viewer's viewport (206).

The peripheral-vision expanded image (200) may be used to cover the entirety of the viewport plus a safety margin. If the peripheral-vision expanded image (200) happens to be insufficient to cover the entirety of the viewport, then filler pixels may be used for some (e.g., tiny, etc.) portions inside the viewport.

In some embodiments, multiple focal-vision image portions may be generated in the peripheral-vision expanded image (200) generated in reference to the viewer's view direction determined or predicted for a time point at which the peripheral-vision expanded image (200) is to be rendered. Additionally, optionally or alternatively, multiple peripheral-vision (e.g., near-peripheral, mid-peripheral, far-peripheral, etc.) image portions may be generated in the peripheral-vision expanded image (200) generated in reference to the viewer's view direction determined or estimated for a time point at which the peripheral-vision expanded image (200) is to be rendered.

In some embodiments, one or more other image portions in addition to focal-vision and peripheral-vision image portions may be generated for a peripheral-vision expanded image as described herein. The other image portions and the focal-vision and peripheral-vision image portions collectively represent all the image data in the peripheral-vision expanded image generated in reference to the viewer's view direction determined or predicted for a time point at which a display mapped image generated from the peripheral-vision expanded image (200) is to be rendered.

Image metadata (e.g., peripheral-vision expansion metadata, display management metadata, etc.) that indicates how an image, and image portions therein, should be spatially distorted may be generated by a video streaming server for peripheral-vision expanded video content. Under techniques as described herein, Based on the image metadata, a recipient device can apply different spatial distortions (including but not limited to no distortion for a focal-vision image portion) in different image portions of an image that is received or decoded, along with the image metadata, in a video signal.

5. Example Video Streaming Servers and Clients

Techniques as described herein can be implemented to benefit consumers or viewers of various types of video-related applications (including but not limited to VR applications) by providing them with a premium experience the same as or similar to a cinema-immersive viewing experience when watching display or rendered images sourced from various types of video content (including but to limited to traditional content designated or optimized to be viewed with a limited viewport of a traditional image display, etc.).

FIG. 3A illustrates an example video streaming server 300 that comprises a peripheral-vision-expanded image processor 302, a peripheral-vision-expanded image generator 312, etc.

Content producers or distributors can use the method to generate cinema-immersive content in a video application such as a VR application, an AR application, a remote presence application, a computer gaming application, a home video display application, etc., for example with a headmounted device operated by a viewer. In some embodiments, the peripheral-vision-expanded image processor (302) comprises a source image receiver 306, a data repository 310, etc. Some or all of the components of the video streaming server (300) may be implemented by one or more devices, modules, units, etc., in software, hardware, a combination of software and hardware, etc.

In some embodiments, the source image receiver (306) comprises software, hardware, a combination of software and hardware, etc., configured to receive an input source image stream 304 from a source image source such as a local data store, a cloud-based source image source, a camera system in connection with a VR application, an AR application, a remote presence application, a display application, etc.; decode the input source image stream (304) into one or more input source images (e.g., a time sequence of input 2D or 3D source images, etc.); etc.

Example input source images may include, but are not necessarily limited to only, traditional content designated to be presented in a viewport of less than 30 degrees, 50 degrees, 70 degrees, etc. By comparison, peripheral-vision expanded images generated from the source images may support an expanded viewport (e.g., of a VR headmounted device, an AR headmounted device, etc.) that is 50%, 100%, etc., more than the viewport typically associated with presenting the traditional content in a rectangular display. The peripheral-vision expanded images may cover a viewport of no less than 180 degrees, and/or up to 360 degrees.

In some embodiments, the data repository (310) represents one or more databases, one or more data storage units/modules/devices, etc., configured to support operations such as storing, updating, retrieving, deleting, etc., with respect to some or all of the input source images, etc.

In some embodiments, the peripheral-vision-expanded image generator (308) comprises software, hardware, a combination of software and hardware, etc., configured to receive, via a bidirectional data flow 314, a viewer's view direction data; establish/determine the viewer's view directions (e.g., for each of the two eyes, etc.) over time in relation to a spatial coordinate system in which peripheral-vision expanded video content, or a derivative version thereof, is to be rendered in the viewer's image rendering device (or display device); generate an overall video stream encoded with the peripheral-vision expanded video content and/or corresponding image metadata, etc. The peripheral-vision expanded video content and/or corresponding image metadata may be separately and specifically generated in reference to the viewer's (e.g., determined, predicted, estimated, etc.) view directions at respective time points, and may be delivered to a downstream device via the bidirectional data flow 314 (e.g., directly or indirectly through intermediate devices, etc.). The downstream device may represent a video streaming client, a display device, a storage device, a video decoder operating with a target display, etc.

Additionally, optionally, or alternatively, some or all of image processing operations such as image rotation determination, image alignment analysis, scene cut detections, transformation between coordinate systems, temporal dampening, display management, content mapping, color mapping, field-of-view management, etc., may be performed by the video streaming server (300).

The video streaming server (300) may be used to support real time immersive video applications, near-real-time immersive video applications, real time non-immersive video applications, near-real-time non-immersive video applications, non-real-time immersive video applications, virtual reality, augmented reality, automobile entertainment, helmet mounted display applications, heads up display applications, games, 2D display applications, 3D display applications, multi-view display applications, etc. For example, some or all of view direction tracking data, peripheral-vision expanded video content and/or corresponding image metadata generated in reference to the viewer's view directions, etc., are generated or accessed by the video streaming server (300) in real time, in near real time, etc.

FIG. 3B illustrates an example image rendering system 324-1 that comprises a peripheral-vision-expanded image receiver 316, a view direction tracker 326, a display manager 318, one or more image displays (or one or more target displays) 320, etc. Some or all of the components of the image rendering system (324-1) may be implemented by one or more devices, modules, units, etc., in software, hardware, a combination of software and hardware, etc.

In some embodiments, the peripheral-vision-expanded image receiver (316) comprises software, hardware, a combination of software and hardware, etc., configured to send, via a bidirectional data flow 314, the viewer's view direction tracking data, which can be used by a video streaming server to establish/determine the viewer's view directions over time in relation to a spatial coordinate system in which peripheral-vision expanded video content is to be rendered in the viewer's image displays (320); receive an overall video stream encoded with the peripheral-vision expanded video content and/or the image metadata derived from the source images; etc.

The user may move the user's view directions at runtime. In some embodiments, the view direction tracker (326) comprises software, hardware, a combination of software and hardware, etc., configured to generate view direction data related to the viewer over time. The view direction tracking data may be sampled or measured at a relatively fine time scale (e.g., every millisecond, every five milliseconds, etc.). The view direction tracking data may be used to establish/determine the viewer's view directions at a given time resolution (e.g., every millisecond, every five milliseconds, etc.).

In some embodiments, the image rendering system (324-1) is configured to generate display video content, based on the peripheral-vision expanded video content and/or the image metadata, to be rendered on the user's display. De-blocking operations, de-contouring operations, blurring operations, directional and/or non-directional filtering, etc., may be performed as a part of compositing the unified imagery to be rendered on the user's display.

In some embodiments, the display manager (318) comprises software, hardware, a combination of software and hardware, etc., configured to perform image processing operations (including but not limited to DM operations) on the peripheral-vision expanded video content to generate the display video content; output the display video content (e.g., in an HDMI signal, etc.) to the image displays (320) for rendering; etc.

Additionally, optionally, or alternatively, some or all of image rendering operations such as view direction tracking, motion detection, position detection, rotation determination, transformation between coordinate systems, temporal dampening of time-varying image parameters, any other temporal manipulation of image parameters, display management, content mapping, tone mapping, color mapping, field-of-view management, prediction, navigations through mouse, trackball, keyboard, foot tracker, actual body motion, etc., may be performed by the image rendering system (324-1).

The image rendering system (324-1) may be used to support real time immersive video applications, near-real-time immersive video applications, non-real-time immersive video applications, real time non-immersive video applications, near-real-time non-immersive video applications, non-real-time non-immersive video applications, virtual reality, augmented reality, automobile entertainment, helmet mounted display applications, heads up display applications, games, 2D display applications, 3D display applications, multi-view display applications, etc. For example, some or all of view direction data, multiple image portions and multiple DM metadata portions generated in reference to the viewer's view directions, etc., are generated or accessed by the image rendering system (324-1) in real time, in near real time, etc.

Techniques as described herein can be implemented in a variety of system architectures. Some or all image processing operations as described herein can be implemented by one or more of cloud-based video streaming servers, video streaming servers collocated with or incorporated into video streaming clients, image rendering systems, image rendering systems, display devices, etc. Based on one or more factors such as types of video applications, bandwidth/bitrate budgets, computing capabilities, resources, loads, etc., of recipient devices, computing capabilities, resources, loads, etc., of video streaming servers and/or computer networks, etc., some image processing operations can be performed by a video streaming server, while some other image processing operations can be performed by a video streaming client, an image rendering system, a display device, etc.

FIG. 3C illustrates an example configuration in which a peripheral-vision-expanded image generator (e.g., 312, etc.) is incorporated into an edge video streaming server 324-2. In some embodiments, a peripheral-vision-expanded image processor 302 of FIG. 3C may be cloud-based. In some embodiments, the peripheral-vision-expanded image processor (302) may be located in a core network separate from edge devices such as the edge video streaming server (324-2). As in FIG. 3A, the peripheral-vision-expanded image processor (302) may comprise a source image receiver 306, a data repository 310, etc. The peripheral-vision-expanded image processor (302) may represent an upstream video streaming server that communicates with the edge video streaming server (324-2) over relatively high bitrates. Some or all of the components of the peripheral-vision-expanded image processor (302) and/or the edge video streaming server (324-2) may be implemented by one or more devices, modules, units, etc., in software, hardware, a combination of software and hardware, etc.

In some embodiments, the peripheral-vision-expanded image processor (302) is configured to output source images in a data flow 322 to downstream devices one of which may be the edge video streaming server (324-2).

In some embodiments, the edge video streaming server (324-2), or the peripheral-vision-expanded image generator (312) therein, comprises software, hardware, a combination of software and hardware, etc., configured to determine a viewer's view direction over time in relation to a spatial coordinate system in which peripheral-vision expanded video content is to be rendered in the viewer's display device; generate an overall video stream encoded with the peripheral-vision expanded video content and/or corresponding image metadata derived from the source images, etc. The peripheral-vision expanded video content and/or corresponding image metadata may be separately and specifically generated in reference to the viewer's (e.g., determined, predicted, estimated, etc.) view directions at respective time points, and may be delivered to a downstream device via the bidirectional data flow 314 (e.g., directly or indirectly through intermediate devices, etc.).

In some embodiments, an image rendering device (e.g., 324-1), or a display manager (e.g., 318 of FIG. 3B) therein, comprises software, hardware, a combination of software and hardware, etc., configured to perform image processing operations on the peripheral-vision expanded video content to generate display video content; output the display video content (e.g., in an HDMI signal, etc.) to the image displays for rendering; etc.

The viewer may move the viewer's view directions at runtime. The image rendering system (324-2) is configured to generate peripheral-vision expanded video content (or a derivative version thereof) to be rendered on the viewer's display device. De-blocking operations, de-contouring operations, blurring operations, etc., may be performed as a part of compositing the unified imagery to be rendered on the user's display.

6. Example Process Flows

Figure 4A:
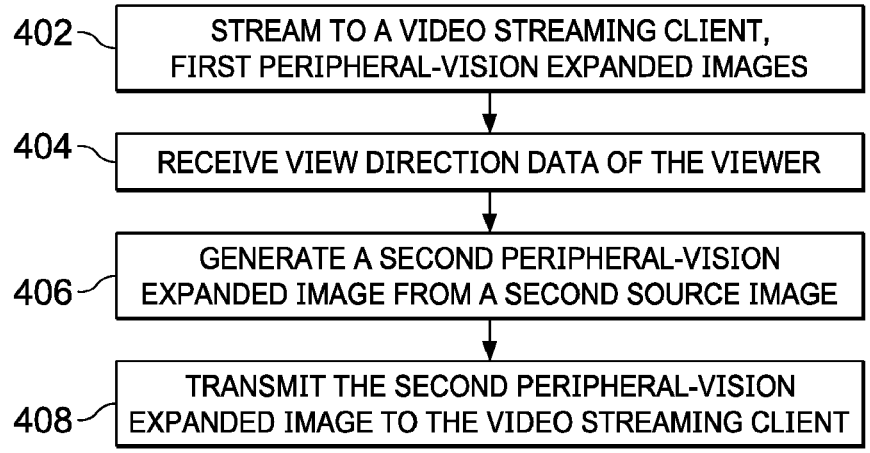
FIG. 4A and FIG. 4B illustrate example process flows.

FIG. 4A illustrates an example process flow according to an example embodiment. In some example embodiments, one or more computing devices or components may perform this process flow. In block 402, a peripheral-vision-expanded image processor (e.g., a video streaming server or a video streaming client of FIG. 3A through FIG. 3C, etc.) streams to a video streaming client, one or more peripheral-vision expanded images. The one or more peripheral-vision expanded images are to be used by the video streaming client to generate one or more display images for rendering to a viewer at one or more time points. The one or more peripheral-vision expanded images are generated from one or more source images in reference to one or more view directions of the viewer at the one or more time points.

In block 404, the peripheral-vision-expanded image processor receives at least a part of view direction data of the viewer collected in real time while the viewer is viewing the one or more display images. The view direction data is used to determine a second view direction of the viewer at a second time point subsequent to the one or more time points;

In block 406, the peripheral-vision-expanded image processor generates a second peripheral-vision expanded image from a second source image in reference to the second view direction of the viewer at the second time point. The second peripheral-vision expanded image is to be used by the video streaming client to generate a second display image for rendering to the viewer at the second time point. The second peripheral-vision expanded image has a focal-vision image portion covering the second view direction of the viewer and a peripheral-vision image portion outside the focal-vision image portion. The focal-vision image portion of the second peripheral-vision expanded image is generated from a first corresponding source image portion in the second source image to cover the viewer's focal vision as covered by the first corresponding source image portion. The peripheral-vision image portion of the second peripheral-vision expanded image is generated by spatially stretching a second corresponding source image portion in the second source image to cover the viewer's peripheral vision including one or more peripheral vision portions not covered by the second corresponding source image portion of the second source image.

In block 408, the peripheral-vision-expanded image processor transmits the second peripheral-vision expanded image to the video streaming client.

In an embodiment, the peripheral-vision-expanded image processor is further configured to perform: generating image metadata to be transmitted to the video streaming client; the image metadata is used by the video streaming client to generate peripheral-vision expanded video content.

In an embodiment, the second peripheral-vision expanded image represents one of: an immersive image, a panorama image, an augmented reality image, a virtual reality image, a remote presence image, etc.

In an embodiment, the one or more time points and the second time point collectively represent consecutive time points covering a time interval.

In an embodiment, the second focal-vision image portion in the second display image covers the viewer's foveal-vision up to a maximum linear angular value: between 2 and 4 degrees, between 4 and 6 degrees, between 6 and 8 degrees, and so forth.

In an embodiment, the one or more source images and the second source image are a part of two-dimensional (2D) video content designated to be presented on a rectangular image rendering surface with a relatively limited field of view.

In an embodiment, the one or more display images and the second display image are a part of peripheral-vision expanded video content designated to be presented on a target display of headmounted device of the viewer with a relatively large field of view.

In an embodiment, the one or more display images and the second display image are a part of peripheral-vision expanded video content designated to be presented on a target display of headmounted device of the viewer with a relatively large field of view.

In an embodiment, a sound source as visually depicted in the one or more display images and the second display image is moved from an original spatial position in the one or more source images and the second source image to a new spatial position in the one or more display images and the second display image; the peripheral-vision-expanded image processor is further configured to perform: causing an audio rendering system to render sounds designated to be emitted from the sound source from the new spatial position.

In an embodiment, the one or more display images and the second display image is rendered with a curved screen; and wherein the curved screen is a virtual display screen.

In an embodiment, the one or more display images and the second display image comprise three-dimensional (3D) display image portions.

In an embodiment, the one or more source images and the second source image represent two-dimensional (2D) images; the 3D display image portions are generated using depth data portions generated from applying 2D to 3D conversion operations on corresponding 2D source image portions in the one or more source images and the second source image.

In an embodiment, the depth data portions are used to determine whether specific objects in a peripheral region of the one or more source image and the second source image are located relatively far away as compared with foveal vision objects; the peripheral-vision-expanded image processor is further configured to perform: in response to determining that the specific objects in the peripheral region are located relatively far away as compared with the foveal vision objects, increasing deterioration in one or more of: acuity, luminance dynamic range, color precision, or bit depth, in the peripheral region of the one or more display images and the second display image.

In an embodiment, the 2D to 3D conversion operations are dependent on an individual inter-pupil distance of the viewer.

In an embodiment, the 2D to 3D conversion operations are performed by positioning two virtual cameras in the viewer's eyes with an individual inter-pupil distance of the viewer.

In an embodiment, one or more depicted objects in the peripheral-vision image portion of the second peripheral-vision expanded image are seamlessly stretched as compared with one or more corresponding depicted objects in the second corresponding image portion of the second source image.

In an embodiment, the one or more depicted objects are seamlessly stretched through one or more of: warping operations, reverse fisheye mapping, linear stretching along a spatial direction, projection operations, conformal mapping, projections analogous to those used in connection with architecture drawings, panini projections, or other projection operations.

In an embodiment, the peripheral-vision image portion of the second peripheral-vision expanded image is of a relatively low resolution as compared with the focal-vision image portion of the second peripheral-vision expanded image.

Figure 4B:
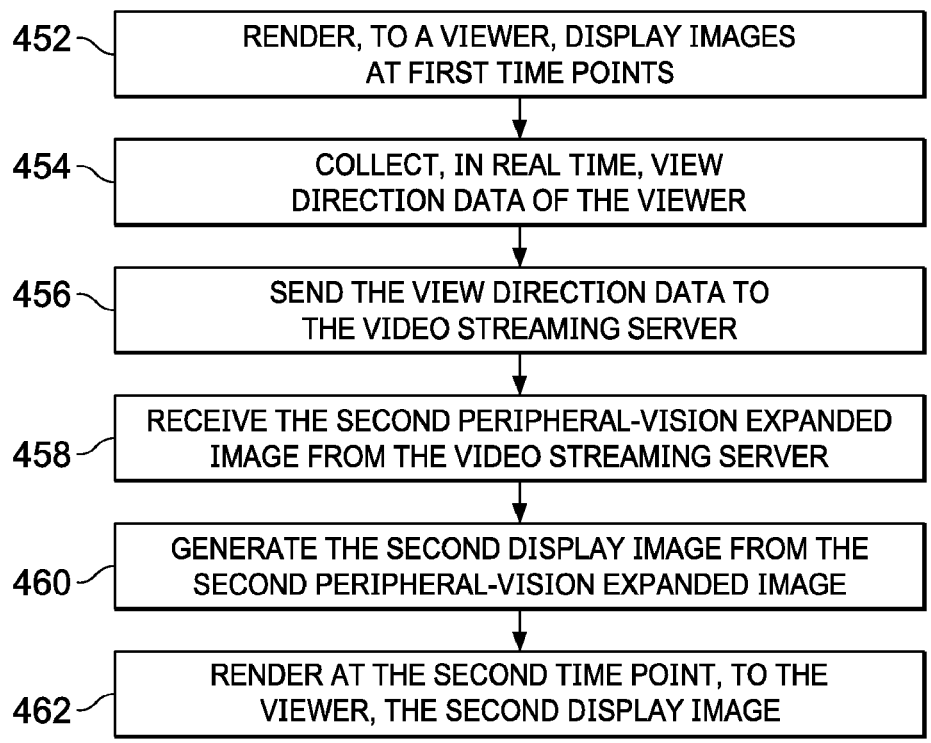

FIG. 4B illustrates an example process flow according to an example embodiment. In some example embodiments, one or more computing devices or components may perform this process flow. In block 452, a video streaming client (e.g., an image rendering system of FIG. 3B, etc.) renders, to a viewer, one or more display images at one or more time points, the one or more display images being generated from one or more peripheral-vision expanded images received from a video streaming server. The one or more peripheral-vision expanded images are generated by the video streaming server from one or more source images in reference to one or more view directions of the viewer at the one or more time points.

In block 454, the video streaming client collects, in real time, view direction data of the viewer collected while the viewer is viewing the one or more display images, the view direction data being used to determine a second view direction of the viewer at a second time point subsequent to the one or more time points.

In block 456, the video streaming client sends at least a part of the view direction data to the video streaming server to cause the video streaming server to generate a second peripheral-vision expanded image from a second source image in reference to the second view direction of the viewer at the second time point, the second peripheral-vision expanded image to be used to generate a second display image for rendering to the viewer at the second time point, the second peripheral-vision expanded image having a focal-vision image portion covering the second view direction of the viewer and a peripheral-vision image portion outside the focal-vision image portion, the focal-vision image portion of the second peripheral-vision expanded image being generated from a first corresponding source image portion in the second source image to cover the viewer's focal vision as covered by the first corresponding source image portion, the peripheral-vision image portion of the second peripheral-vision expanded image being generated by spatially stretching a second corresponding source image portion in the second source image to cover the viewer's peripheral vision including one or more peripheral vision portions not covered by the second corresponding source image portion of the second source image.

In block 458, the video streaming client receives the second peripheral-vision expanded image from the video streaming server.

In block 460, the video streaming client generates the second display image from the second peripheral-vision expanded image.

In block 462, the video streaming client renders at the second time point, to the viewer, the second display image.

In an embodiment, the one or more display images and the second display image are rendered on a target display on a headmounted device of the viewer.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

7. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an example embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In some embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for providing image data to support immersive media content consumption experiences, comprising:
streaming to a video streaming client, one or more peripheral-vision expanded images, the one or more peripheral-vision expanded images to be used by the video streaming client to generate one or more display images for rendering to a viewer at one or more time points, the one or more peripheral-vision expanded images being generated from one or more source images in reference to one or more view directions of the viewer at the one or more time points;
receiving at least a part of view direction data of the viewer collected in real time while the viewer is viewing the one or more display images, the view direction data being used to determine a second view direction of the viewer at a second time point subsequent to the one or more time points;
generating a second peripheral-vision expanded image from a second source image in reference to the second view direction of the viewer at the second time point, the second peripheral-vision expanded image to be used by the video streaming client to generate a second display image for rendering to the viewer at the second time point, the second peripheral-vision expanded image having a focal-vision image portion covering the second view direction of the viewer and a peripheral-vision image portion outside the focal-vision image portion, the focal-vision image portion of the second peripheral-vision expanded image being generated from a first corresponding source image portion in the second source image to cover the viewer's focal vision as covered by the first corresponding source image portion, the peripheral-vision image portion of the second peripheral-vision expanded image being generated by spatially stretching a second corresponding source image portion in the second source image to cover the viewer's peripheral vision including one or more peripheral vision portions not covered by the second corresponding source image portion of the second source image;
transmitting the second peripheral-vision expanded image to the video streaming client.

2. The method of claim 1, further comprising: generating image metadata to be transmitted to the video streaming client, wherein the image metadata is used by the video streaming client to generate peripheral-vision expanded video content.

3. The method of claim 1, wherein the second peripheral-vision expanded image represents one of: an immersive image, a panorama image, an augmented reality image, a virtual reality image, or a remote presence image.

4. The method of claim 1, wherein the one or more time points and the second time point collectively represent consecutive time points covering a time interval.

5. The method of claim 1, wherein the second focal-vision image portion in the second display image covers the viewer's foveal-vision up to a maximum linear angular value: between 2 and 4 degrees, between 4 and 6 degrees, between 6 and 8 degrees, or another angular value range.

6. The method of claim 1, wherein the one or more source images and the second source image are a part of two-dimensional (2D) video content designated to be presented on a rectangular image rendering surface with a relatively limited field of view.

7. The method of claim 1, wherein the one or more display images and the second display image are a part of peripheral-vision expanded video content designated to be presented on a target display of headmounted device of the viewer with a relatively large field of view.

8. The method of claim 1, wherein the one or more display images and the second display image are a part of peripheral-vision expanded video content designated to be presented on a target display of headmounted device of the viewer with a relatively large field of view.

9. The method of claim 1, wherein a sound source as visually depicted in the one or more display images and the second display image is moved from an original spatial position in the one or more source images and the second source image to a new spatial position in the one or more display images and the second display image; the method further comprising: causing an audio rendering system to render sounds designated to be emitted from the sound source from the new spatial position.

10. The method of claim 1, wherein the one or more display images and the second display image is rendered with a curved screen; and wherein the curved screen is a virtual display screen.

11. The method of claim 1, wherein the one or more display images and the second display image comprise three-dimensional (3D) display image portions.

12. The method of claim 11, wherein the one or more source images and the second source image represent two-dimensional (2D) images; and wherein the 3D display image portions are generated using depth data portions generated from applying 2D to 3D conversion operations on corresponding 2D source image portions in the one or more source images and the second source image.

13. The method of claim 1, wherein one or more depicted objects in the peripheral-vision image portion of the second peripheral-vision expanded image are seamlessly stretched as compared with one or more corresponding depicted objects in the second corresponding image portion of the second source image.

14. The method of claim 1, wherein the peripheral-vision image portion of the second peripheral-vision expanded image is of a relatively low resolution as compared with the focal-vision image portion of the second peripheral-vision expanded image.

15. An apparatus performing the method of claim 1.

16. A system performing the method of claim 1.

17. A non-transitory computer readable storage medium, storing software instructions, which when executed by one or more processors cause performance of the method recited in claim 1.

18. A computing device comprising one or more processors and one or more non-transitory computer-readable storage media, storing a set of instructions, which when executed by one or more processors cause performance of the method recited in method claim 1.

19. A method for providing immersive media content consumption experiences, comprising:

rendering, to a viewer, one or more display images at one or more time points, the one or more display images being generated from one or more peripheral-vision expanded images received from a video streaming server, the one or more peripheral-vision expanded images being generated by the video streaming server from one or more source images in reference to one or more view directions of the viewer at the one or more time points;

collecting, in real time, view direction data of the viewer collected while the viewer is viewing the one or more display images, the view direction data being used to determine a second view direction of the viewer at a second time point subsequent to the one or more time points;

sending at least a part of the view direction data to the video streaming server to cause the video streaming server to generate a second peripheral-vision expanded image from a second source image in reference to the second view direction of the viewer at the second time point, the second peripheral-vision expanded image to be used to generate a second display image for rendering to the viewer at the second time point, the second peripheral-vision expanded image having a focal-vision image portion covering the second view direction of the viewer and a peripheral-vision image portion outside the focal-vision image portion, the focal-vision image portion of the second peripheral-vision expanded image being generated from a first corresponding source image portion in the second source image to cover the viewer's focal vision as covered by the first corresponding source image portion, the peripheral-vision image portion of the second peripheral-vision expanded image being generated by spatially stretching a second corresponding source image portion in the second source image to cover the viewer's peripheral vision including one or more peripheral vision portions not covered by the second corresponding source image portion of the second source image;

receiving the second peripheral-vision expanded image from the video streaming server;

generating the second display image from the second peripheral-vision expanded image;

rendering at the second time point, to the viewer, the second display image.

20. The method of claim 19, wherein the one or more display images and the second display image are rendered on a target display on a headmounted device of the viewer.

* * * * *